United States Patent
Casey

(10) Patent No.: US 8,824,113 B2
(45) Date of Patent: Sep. 2, 2014

(54) HIGH VOLTAGE INTERLOCK CIRCUIT UTILIZING SERIAL COMMUNICATIONS

(75) Inventor: Colin Jay Casey, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 177 days.

(21) Appl. No.: 13/634,454

(22) PCT Filed: Mar. 15, 2010

(86) PCT No.: PCT/US2010/027280
§ 371 (c)(1),
(2), (4) Date: Sep. 12, 2012

(87) PCT Pub. No.: WO2011/115608
PCT Pub. Date: Sep. 22, 2011

(65) Prior Publication Data
US 2013/0003237 A1    Jan. 3, 2013

(51) Int. Cl.
*H02H 7/00* (2006.01)
*B60L 11/18* (2006.01)
*B60L 3/00* (2006.01)

(52) U.S. Cl.
CPC .......... *B60L 3/0046* (2013.01); *B60L 11/1838* (2013.01); *Y02T 10/7088* (2013.01); *Y02T 90/128* (2013.01); *Y02T 10/7005* (2013.01); *B60L 3/0069* (2013.01); *Y02T 90/16* (2013.01); *Y02T 90/14* (2013.01); *Y02T 90/163* (2013.01)
USPC .......................................................... 361/62

(58) Field of Classification Search
USPC .......................................................... 361/62
See application file for complete search history.

(56) References Cited

U.S. PATENT DOCUMENTS

| | | | |
|---|---|---|---|
| 4,799,126 A | 1/1989 | Kruse et al. | |
| 5,894,397 A | 4/1999 | Nelson | |
| 5,949,806 A | 9/1999 | Ness et al. | |
| 6,411,912 B1 * | 6/2002 | Sack | 702/63 |
| 7,402,068 B1 * | 7/2008 | Tarchinski | 439/350 |
| 7,612,524 B2 | 11/2009 | Howell et al. | |
| 8,393,689 B2 * | 3/2013 | Griffith et al. | 303/126 |

FOREIGN PATENT DOCUMENTS

WO    PCT/US/27280    9/2012

* cited by examiner

*Primary Examiner* — Stephen W Jackson
(74) *Attorney, Agent, or Firm* — Jeffrey P. Calfa; Mark C. Bach

(57) ABSTRACT

The system provides for controlling the connection of electrical power sources to electrical loads installed on a motor vehicle and limiting exposure of personnel to relatively high electrical voltages from the electrical power sources. The system includes a serial communication bus and power cables routed through the motor vehicle. At least a first connector is provided through which the serial communication bus and a power cable are routed allowing temporary severing of the serial communication bus and the power cable. The power cable includes a circuit interrupter which isolates the connector from the electrical power source in response to certain conditions on the serial communication bus, including, but not limited to, the cessation of data traffic on the serial communication bus.

10 Claims, 3 Drawing Sheets

HIGH VOLTAGE INTERLOCK CIRCUIT UTILIZING SERIAL COMMUNICATIONS

BACKGROUND

1. Technical Field

The technical field relates generally to interlocks for isolating electrical power sources and more particularly to their application to power cables and cable connectors on motor vehicles.

2. Description of the Problem

Hybrid-electric and electric vehicles provide storage of electrical power in batteries or on capacitors. Such batteries and capacitors have terminal to terminal voltage differentials which are greater by more than an order of magnitude than chassis batteries used on most contemporary trucks and cars. Cables connected to the batteries can exhibit these relatively high potentials on terminal plugs at points of connection to the vehicle electrical system.

In applications where personnel are potentially exposed to high voltages, interlock circuits have been used to isolate the high voltage source when connectors are opened and could potentially expose terminals which could carry high voltages. U.S. Pat. No. 5,949,806 (Ness et al.) teaches one such High Voltage Interlock Circuit. In addition, connectors used in high voltage application have been modified to support addition of an interlock circuit which is interrupted if the connector sections are not securely fastened. For motor vehicles such connectors are commonly provided in four and five wire versions. In a four wire cable, two wires are used for the high voltage circuit and two wires are used for the voltage interlock circuit. In a five wire connector, three wires are used for high voltage and two for the interlock circuit. Both types of connectors provide shielding.

SUMMARY

The system provides for controlling the connection of electrical power sources to electrical loads installed on a motor vehicle through interlocks and limiting exposure of personnel to relatively high electrical voltages thereby. The system includes a high voltage distribution system including power cables routed through the motor vehicle and at least a first serial communication bus routed for some part of its length physically proximate to the power cables. Interlock activation functions may be carried out using the serial communication bus in place of a dedicated interlock circuit. At least a first connector is provided through which the serial communication bus and a power cable are routed allowing temporary severing of the serial communication bus and the power cable. A power cable interrupter is located in the power cable to allow electrical isolation of the proximate side of the connector from an electrical power source. A signal interpreter is coupled to the serial communication bus. The signal interpreter is responsive to changes in communication traffic or bus impedance indicating opening of the connector. Responsive to the status of the traffic or bus impedance, the signal interpreter controls the state of the power cable interrupter. In addition, a specific instruction for generating command signals for controlling the state of the power cable interrupter may be applied to the serial communication bus or to a another serial communication bus.

DETAILED DESCRIPTION

In the following detailed description example, sizes/models/values/ranges may be given with respect to specific embodiments but are not to be considered generally limiting.

Figure 1:
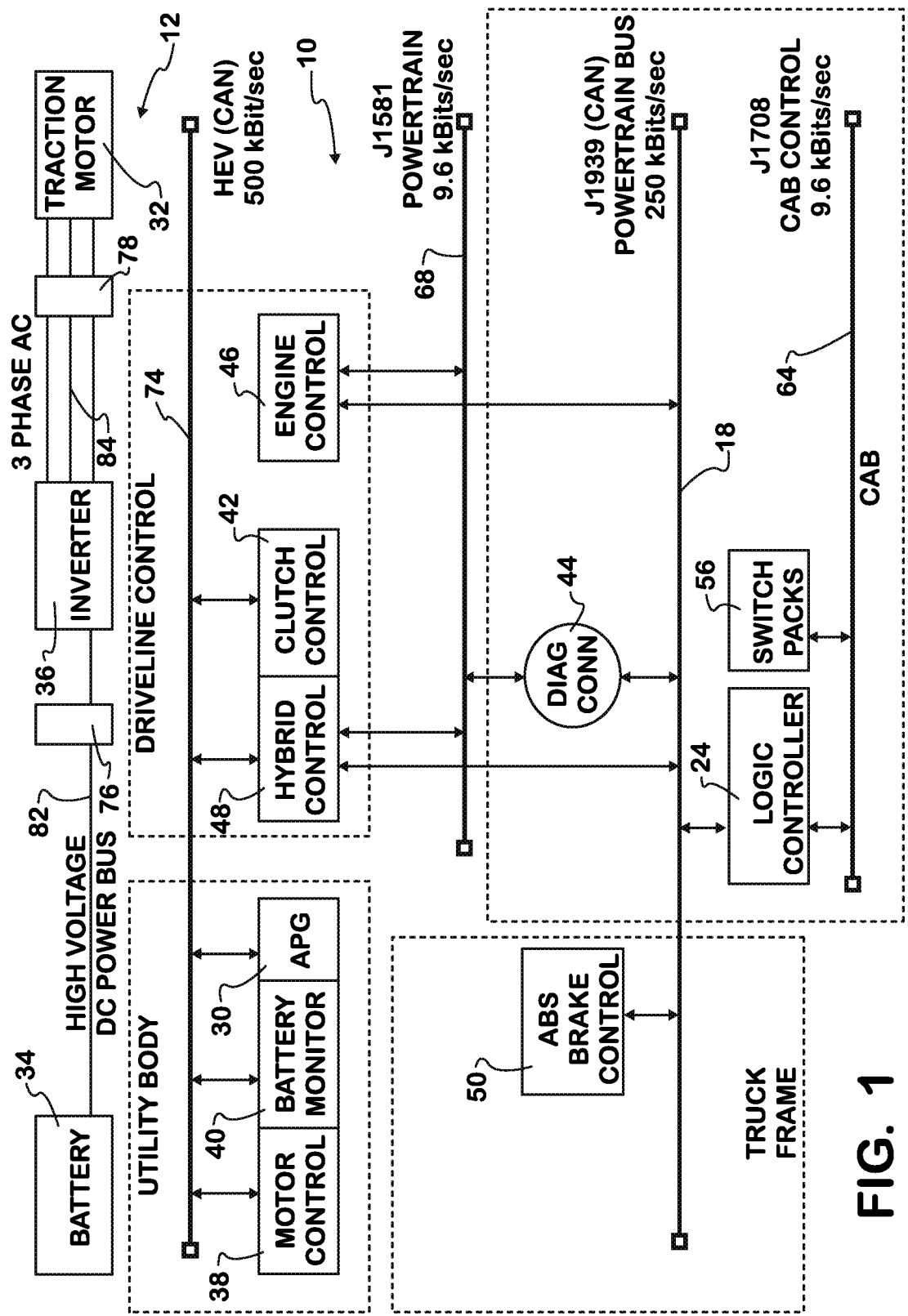
FIG. 1 is a high level schematic of a control system for a hybrid-electric vehicle.

Referring now to the figures and in particular to FIG. 1, a high level schematic of a control system 10 which provides control over a drive train and a high voltage power distribution system 12 of a hybrid electric vehicle is illustrated. The control system 10 includes several serial communication buses 18, 64, 68, 74 which provide data links among an assortment of controllers and vehicle switches, including a logic/electrical system controller 24, a type of a body computer, which operates as a system supervisor. The serial communication bus 74 is shared by and runs between high voltage components of the control system 10 and thus is available for use in circuit integrity monitoring of the high voltage power distribution system 12.

Logic controller 24 is linked by a Society of Automotive Engineers (SAE) J1939 serial communication bus 18 to a variety of local controllers including an anti-lock brake system (ABS) controller 50, an engine controller 46 and a hybrid controller 48. Hybrid controller 48 is also connected to a serial communication bus 74 (HEV CAN), portions of which are located in close physical proximity to the high voltage power distribution system 12. Hybrid controller 48 and engine controller 46 can also communicate over a fourth communication bus 68 (an SAE J1587 bus). A diagnostic connector 44 is connected to serial communication bus 18 and to communication bus 68. Communications bus 64 allows logic controller 24 to interrogate switch states of in-cab switch packs 56. The controllers connected to serial communication bus 74 include a traction motor controller 38, a battery monitor 40, an auxiliary power (APG) controller 30, a clutch/transmission controller 42 and the hybrid controller 48.

The high voltage power distribution system 12 includes a traction battery 34, a high voltage direct current power bus 82, a circuit interrupter 76, a hybrid inverter 36, a three phase power bus 84, a three phase circuit interrupter 78 and a traction motor 32. Connectors, as described below, may be used in combination with either the high voltage direct current power bus 82 or the three phase power bus 84 and serial communication bus 74. The high voltage power distribution system 12 is accessible for inspection, maintenance and potentially removal of components, including the traction batteries 34.

Depending upon the operational mode of the vehicle power flow may occur in either direction through hybrid inverter 36, from traction motor 32 to traction battery 34 or from traction battery 34 to traction motor 32. In other words, traction battery 34 may be a load or a source of power. Similarly, traction motor 32 may be a load when driven during acceleration, or a source of power when backdriven during regenerative braking of the vehicle. The hybrid inverter 36 can appear to a source or a load from the perspective of either the traction motor 32 or the traction battery 34.

Figure 2:
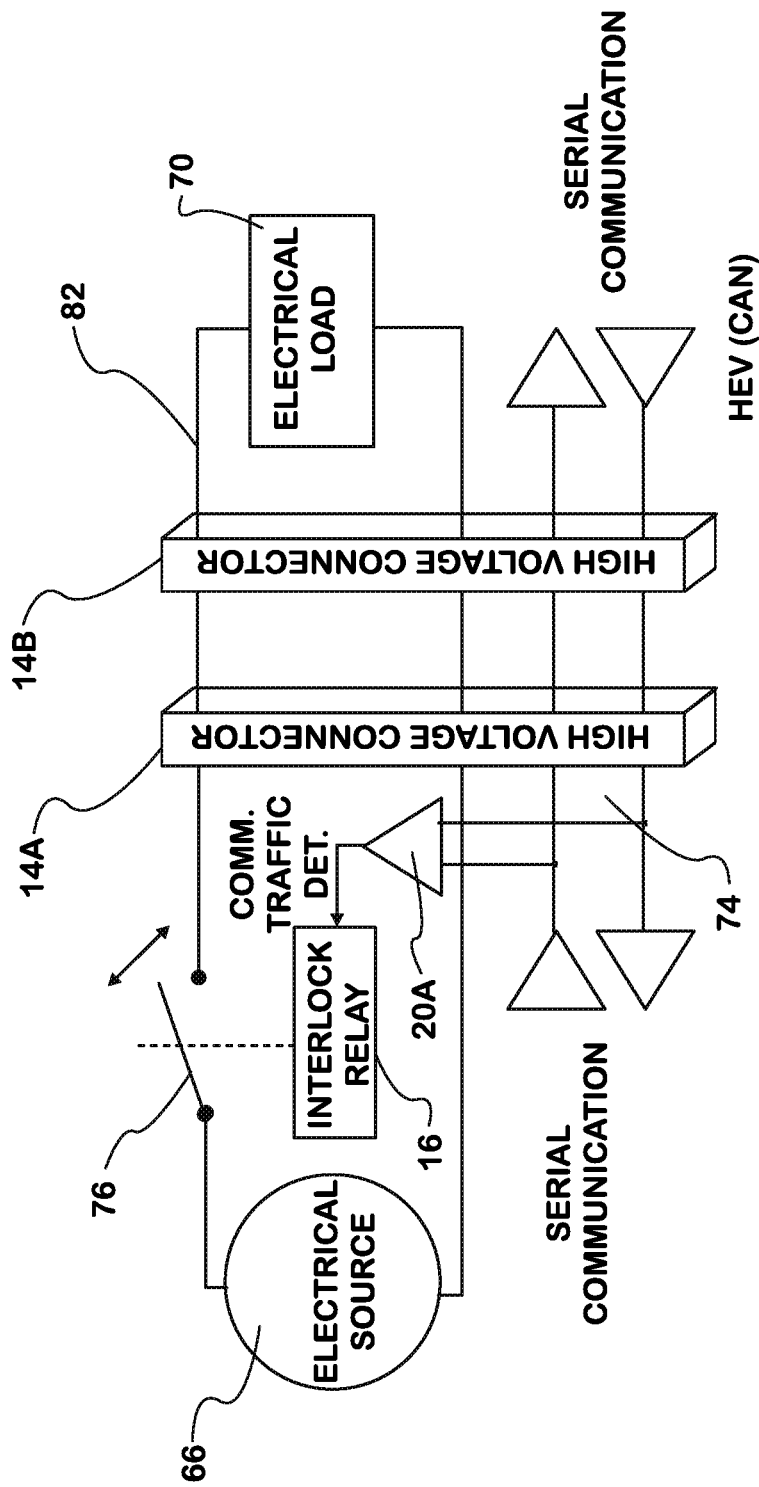
FIG. 2 is a more detailed schematic of an interlock circuit for power cabling on a hybrid-electric vehicle.

Because traction batteries 34 and traction motor 32 can change roles as to which is a source and which a load, depending upon the operational mode of the vehicle, FIG. 2 refers to generic electrical "sources 66" and "loads 70". Removal of generic electrical sources 66 and generic electrical loads 70 is eased by providing electrical connection to the components represented by use of plug connectors 14A and 14B in the power conductors. Plug connectors 14A and 14B may be opened and closed by hand. The potential exposure of personnel to voltages of 300 volts or greater which may be sourced from traction battery 34 are limited by interrupting the power cables between the electrical source 66 and the connector 14A before the connectors 14A and B are fully separated.

Either high voltage DC power bus 82 or three phase power bus 84 may be interrupted to isolate connectors 14A, B from an electrical power source 66. FIG. 2 illustrates provision of an interlock relay 16 to control the open and closed states of a DC circuit interrupter 76 located in the high voltage direct current power bus 82. Circuit interrupter is located between the ungrounded terminal of the generic electrical source 66 (typically corresponding to traction battery 34) and the generic electrical load 70 (here corresponding to hybrid inverter 36). The interlock relay 16 can also be used to control the open and closed states of a three phase circuit interrupter 78 located in the three phase power bus 84 connecting the three phase AC terminals of the hybrid inverter 36 to the traction motor 32. Circuit interrupter 76 or three phase circuit interrupter 78 may be realized in various ways, for example as power MOSFETs, open collector NPN transistors, vacuum triodes, solenoid activated relays, etc.

Interlock relay 16 operates in response to a signal generated in response to an absence of data traffic on serial communication bus 74, or, possibly, to absence of detection of a bus terminating impedance upon application of impedance detection signal. Data traffic on serial communication bus 74 ceases, and one of the bus terminating impedances would be cut off, upon separation of connectors 14A and 14B through which serial communication bus 74 is connected. A signal interpreter is provided for generation of the signal to be applied to the interlock relay 16. The signal interpreter may take a number of different forms. For example, the signal interpreter may be a serial communication bus traffic detector 20. The signal interpreter may add a bus node, including a CAN communication interface, for receiving instructions over a second serial communication bus. In this case a microprocessor is added and programmed to decode commands which control operation of the interlock relay 16 and thereby the state of the circuit interrupter 76 or three phase circuit interrupter 78. Such a response is software based and thus could operate in response to the status of various sensors around a vehicle, such as opening of an access panel in the area of the electrical power source or detection of an accident (e.g. air bag deployment).

Serial Communication bus traffic detector 20 is implemented as hardware. A pair of sense wires 80 are provided for connection to each wire in serial communication bus 74. If serial communication bus 74 is active, that is carrying data traffic, it will undergo regular voltage transitions. For a J1939 CAN serial communication bus the voltage transitions are typically between negative 50 millivolts and positive 2.5 volts.

Serial communication bus traffic detector 20 is responsive to voltage differentials associated with data traffic appearing between the wires of serial communication bus 74 for generating a signal which, applied to interlock relay 16, results in generation of a signal by the interlock relay which keeps circuit interrupter 76 closed. A lack of data traffic on the serial communication bus 74 results in a change in state of the signal from interlock relay 16 opening the circuit interrupter 76. Absence of data must persist past a minimum time threshold for a no traffic status to be indicated.

Serial communication bus 74 is routed in close proximity to high voltage cables of the high voltage power distribution system 12 and is routed through the interlock circuit conductors of a conventional four wire connectors 14A and 14B displacing a conventional interlock circuit, or a five wire connector if used for the three phase power bus 84.

Figure 3:
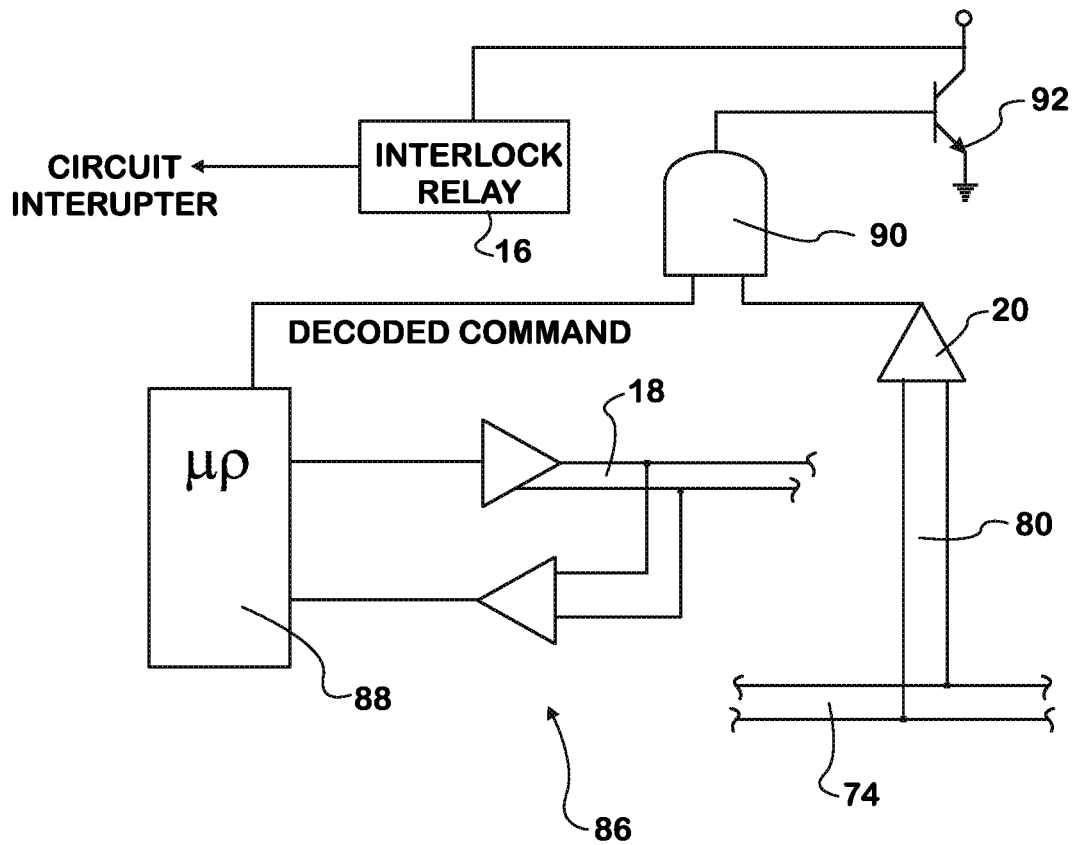
FIG. 3 is a circuit schematic of a mixed source interlock circuit for power cabling on a hybrid-electric vehicle.

In addition to monitoring for interruption of the serial communication bus 74, the circuit interrupters 76, 78 may be opened in response to a command to do so over another serial communication bus, for example serial communication bus 18. FIG. 3 illustrates addition of monitoring for logical control signal to data traffic monitoring. Serial communication bus 74 is connected, as before, by a pair of sense wires 80 to serial communication bus traffic detector 20, which provides a signal to an input terminal of an AND gate 90. To detect and decode a logical control signal a CAN interface 86 is coupled to a second serial communication bus 18, which carries auxiliary signals directing opening or closing of the interlock relay 16 for transmission over the serial communication bus 74. A microprocessor 88 is connected to the CAN interface 86 which identifies control signals intended for the node and operates on the signals to generate a two state signal for application to a second input terminal of AND gate 90. Thus there must both be traffic on the serial communication bus 74 and the current control value received over serial communication bus 18 must indicate that the circuit interrupters 76 or 78 are to remain closed for the circuit interrupters to remain closed. The command signal to command connection of the high voltage bus is broadcast to the microprocessor 88 on a regular interval, and if the command signal ceases to be received, then the microprocessor 88 issues a decoded command to the AND gate 90 and subsequent logic gate output amplifier 92 to interrupt the high voltage bus by interlock relay 16. The output of the AND gate 90 may be routed through the logic gate output amplifier amplifier 92 before application to the interlock relay 16.

What is claimed is:

1. An interlock system for an electrical power cabling, comprising:
    a serial communication bus;
    a circuit interrupter connected into the electrical power cabling having open and closed states;
    a connector including contacts for the electrical power cabling and contacts for an interlock circuit;
    the serial communication bus being routed through the contacts for an interlock circuit of the connector;
    means connected to the serial communication bus for supplying signals over serial communication bus;
    a signal interpreter coupled to the serial communication bus responsive to signal levels on the serial communication bus for generating a state signal having first and second states; and
    means responsive to the state of the signal interpreter for opening and closing the circuit interrupter.

2. The interlock system of claim 1, further comprising:
    the signal interpreter including a signal traffic detector connected by sense wires to the serial communication bus, the signal traffic detector providing for generating the state signal where the first state opens the circuit interrupter and the second state allows the circuit interrupter to close.

3. The interlock system of claim 2, further comprising:
    the signal interpreter including a communication node responsive to an instruction received over a communication link and generating a two state command signal having first and second states where the first state opens the circuit interrupter and the second state allows the circuit interrupter to close; and an AND gate connected to receive connected to receive the state signal and the two state command signal.

4. The interlock system of claim 3, further comprising:

the serial communication bus being part of a vehicle controller area network.

5. A method of generating an interlock signal, comprising the steps of:

routing a serial communication bus though interlock conductors of a multi-connection plug and power cabling through power conductors of the multi-connection plug;

monitoring signal levels indicating ongoing communication traffic on the serial communication bus;

responsive to cessation of communication traffic on the serial communication bus generating interrupting power transmission on the power cable.

6. A system for controlling connection to electrical power sources to electrical loads installed on a motor vehicle, the system comprising:

a serial communication bus routed through the motor vehicle;

power cables routed through the motor vehicle;

at least a first connector through which the serial communication bus and a power cable are routed allowing temporary severing of the serial communication bus and the power cable;

a power cable interrupter located in the power cable to allow electrical isolation of the connector from an electrical power source;

a signal interpreter coupled to the serial communication bus, the signal interpreter being responsive to one of communication traffic, bus impedance or a specific instruction for generating command signals for controlling the state of the power cable interrupter.

7. A system as set forth in claim 6, further comprising:

the serial communication bus being part of a controller area network.

8. A system as set forth in claim 7, further comprising:

the signal interpreter being a communication traffic detector.

9. A system as set forth in claim 8, further comprising:

the power cables providing for the transmission of three phase alternating current power.

10. A system as set forth in claim 8, further comprising:

the power cables including two cables.

* * * * *